United States Patent [19]

Snyder

[11] Patent Number: 5,363,489

[45] Date of Patent: Nov. 8, 1994

[54] AUXILIARY CIRCUIT FOR COMPLEMENTING THE SIGNALING OF INCOMPATIBLE PROTOCOL SYSTEMS

[75] Inventor: James H. Snyder, North Plainfield, N.J.

[73] Assignee: AT&T Bell Laboratories, Murray Hill, N.J.

[21] Appl. No.: 814,950

[22] Filed: Dec. 30, 1991

[51] Int. Cl.$^5$ .............................................. G06F 13/12
[52] U.S. Cl. ..................... 395/275; 395/325; 395/800
[58] Field of Search ............. 395/275, 700, 800, 250, 395/725, 375; 370/79, 85.5, 94.1, 85.2

[56] References Cited

U.S. PATENT DOCUMENTS

| | | | |
|---|---|---|---|
| 4,677,611 | 7/1987 | Yanosy, Jr. et al. | 370/85.2 |
| 4,716,525 | 12/1987 | Gilianyi et al. | 395/250 |
| 4,845,611 | 7/1989 | Turlakov et al. | 395/250 |
| 4,860,200 | 8/1989 | Holombo | 395/725 |
| 4,951,196 | 8/1990 | Jackson | 364/401 |
| 4,965,771 | 10/1990 | Morikawa et al. | 395/275 |
| 5,067,104 | 11/1991 | Krishnakumar et al. | 395/375 |
| 5,073,852 | 12/1991 | Siegel et al. | 395/700 |
| 5,113,369 | 5/1992 | Kinoshita | 395/325 |
| 5,142,528 | 8/1992 | Kobayashi et al. | 370/79 |
| 5,182,748 | 1/1993 | Sakata et al. | 370/94.1 |
| 5,239,662 | 8/1993 | Danielson et al. | 395/800 |

Primary Examiner—Thomas G. Black
Assistant Examiner—Dan Fiul
Attorney, Agent, or Firm—Jason P. DeMont

[57] ABSTRACT

A digital system in which an integrated circuit complements the signaling protocol of non-standard devices so that the non-standard devices can operate and communicate with other devices as if the non-standard device were able to support the signaling protocol of the other devices. Embodiments of the invention are taught which reduce the overall power consumption in the system, which enhance the functionality of the system, and which reduce the overall package count in the system.

12 Claims, 4 Drawing Sheets

AUXILIARY CIRCUIT FOR COMPLEMENTING THE SIGNALING OF INCOMPATIBLE PROTOCOL SYSTEMS

BACKGROUND OF THE INVENTION

1. Field of the Invention

The present invention relates to digital systems design in general, and more particularly, to methods and systems for integrating multiple devices when the respective devices have disparate signaling protocols.

2. Background

Computers and other digital systems comprise numerous devices (e.g., integrated circuits) which operate synergistically to perform some desired functionality. The synergy is possible only because the physical, temporal and logical parameters regulating the interaction of the devices are carefully defined and meticulously coordinated. For the purpose of this specification, all of the signals, conditions and parameters needed to specify the communication capabilities and requirements of a given device are referred to as the device's signaling protocol.

In general, it is prudent to design and build a digital system solely with devices whose signaling protocols conform to some agreed upon standard. Occasionally, however, it is desirable to include one or more devices whose signaling protocols do not conform. While the incorporation of "non-conforming" devices may be beneficial in some respects, it is disadvantageous in others. First, the use of non-conforming devices can cause a system to dissipate power excessively. Second, the use of non-conforming devices may require additional circuitry, that is, these devices may complicate the control circuitry for the system, especially if the control circuitry is distributed among or between a plurality of control circuit elements. Additionally, such non-conformance may also diminish the ability of the respective devices to communicate and, hence, to affect the desired synergy.

SUMMARY OF THE INVENTION

The present invention provides for the integration of a plurality of devices when the respective devices have disparate signaling protocols. Systems which incorporate embodiments of the present invention are generally more efficient than systems in the prior art, in the sense that they consume less power, use fewer integrated circuits, and are more easily designed.

These results are obtained in an illustrative embodiment of the present invention comprising a source device which sends a set of signals to a destination device and an auxiliary device which supplements the signaling of the source device so that the signals emitted by the auxiliary device and the source device complement each other to accommodate the signaling protocol of the destination device. The auxiliary device can be programmed to recognize when the signaling protocol of the source device requires supplementing. As a programmable device, the auxiliary device can be used in a variety of systems, where each system uses a (potentially different) assortment of conforming and non-conforming devices. Thus, the auxiliary device is not limited to use in a specific system, but rather can be used in a wide range of disparate systems.

In embodiments where (1) the auxiliary device and the destination device are connected via a set of conductors (e.g., a bus) and (2) no information need be conveyed by the auxiliary device to the destination device, the auxiliary device advantageously echoes a subset of the signals most recently transmitted on the set of conductors.

In another embodiment of the present invention, which embodiment has a plurality of source devices, the auxiliary device distinguishes between the respective source devices and provides a set of signals to complement each of the source devices.

In yet another embodiment of the present invention which embodiment has a plurality of destination devices, the auxiliary device provides a set of supplemental signals to accommodate all of the destination devices.

DETAILED DESCRIPTION

Figure 1:
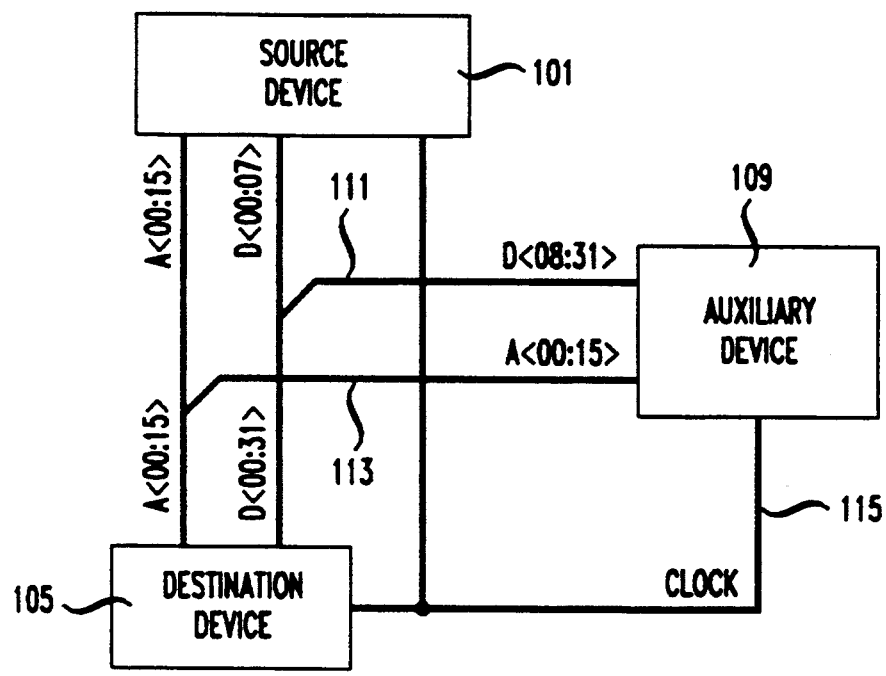
FIG. 1 is a schematic diagram of an illustrative embodiment of the invention which incorporates a single source device and a single, incompatible destination device.

1. Illustrative Embodiments That Conserve Power 1.1. A Single Source Device—A Single Destination Device FIG. 1 is a schematic diagram of an illustrative embodiment of the invention. The embodiment is a binary digital system comprising (1) a 32-bit data bus 111, (2) a 16-bit address bus 113, (3) a clock 115, (4) a source device 101, (5) a destination device 105 and (6) an auxiliary device 109.

The data bus comprises 32 conductors designated $D<00:31>$ respectively and the address bus comprises 16 conductors designated $A<00:15>$ respectively. The clock 115 defines a bus cycle. Each of the three devices is discussed in detail in the following subsections.

1.1.1. The Source Device

The embodiment includes a source device 101 (e.g., an 8-bit universal asynchronous receiver-transmitter) that, according to its signaling protocol, is capable of simultaneously outputting a set of 8 binary signals onto data bus conductors $D<00:07>$. The source device is not capable of interacting with data bus conductors D<08:31>.

In this embodiment the source device receives the clock and receives the full 16-bit address on the address bus. The source device is advantageously "memory mapped" into the system's address map (i.e., the source device is associated with a preassigned address or range of contiguous addresses). See F. J. Hill and G. R. Peterson, *Digital Systems: Hardware Organization and Design,* 2nd Ed., (1978), for a discussion on memory mapping. The source device is capable of recognizing when the address on the address bus corresponds to the source device's assigned address.

When, and only when, the source device recognizes its address on the address bus, the source device outputs a set of signals onto the data bus for the duration of the current bus cycle. When the address on the address bus does not correspond to the source device's address, the source device puts its outputs onto the data bus in a high-impedance state through the use of tri-state outputs.

1.1.2. The Destination Device

The embodiment also includes a destination device 105 (e.g., a 32-bit microprocessor) which, according to its signaling protocol, is capable of simultaneously receiving a set of 32 binary signals from the 32 respective data bus conductors designated D<00:31>. When the source device outputs a set of binary signals to the destination device, via the data bus, each of the destination device's 32 inputs are desirably driven either "high" or "low" to prevent them from "floating" or having an uncertain value. When a device's input is allowed to float in this manner, the circuitry associated with that input often dissipates an excessive amount of power. Unnecessary power dissipation is generally undesirable; in low-power systems such excessive power dissipation can limit system functionality or require remedial measures to be taken.

The destination device is capable of generating and outputting the clock 115. The destination device is also capable of generating and outputting a sixteen bit address on the address bus 113. The destination device is advantageously capable of changing the address on the address bus synchronously with the change of the clock. When the destination device desires to receive input from the source device, the destination device outputs onto the address bus the source device's address. For every bus cycle that the destination device outputs the source device's address, the source device outputs, during that same bus cycle, a set of signals onto D<00:07>.

In this embodiment, the source device is connected only to data bus connectors D<00:07> and, therefore, the source device can only drive the inputs of the destination device that are connected to D<00:07>. Potentially then, the destination device will have 24 inputs (those connected to D<08:31>) dissipating an excessive amount of power.

1.1.3. The Auxiliary Device

To prevent this unwanted power dissipation, the illustrative embodiment in FIG. 1 also includes an auxiliary device 109 which is capable of generating a set of 24 supplementary or "dummy" signals. In accordance with this illustrative embodiment, the 24 dummy signals are transmitted by the auxiliary device, over D<08:31>, to the destination device contemporaneously with the transmission of the set of signals, over D<00:07>, by the source device. Because the auxiliary device conclusively drives each of the destination device's inputs not driven by the source device, none of the destination device's inputs float.

On a symbolic level, the destination device ignores the values of the dummy signals because the destination device did not expect input signals on the leads D<08:31> and the dummy signals are not intended to convey information. Therefore each signal in the set of dummy signals that the auxiliary device generates for transmission to the destination device may be arbitrarily either high or low. In the preferred embodiment, however, the auxiliary device "echoes" onto D<08:31> and thus to the destination device the set of signals that were transmitted, by any device, on data bus conductors D<08:31> during the last bus cycle. By echoing the most recently transmitted set of signals to the destination device, the embodiment further conserves power by reducing the occurrence of signal transitions on the data bus conductors.

For example, the auxiliary device should note at data bus cycle n that data bus conductor D<23> is high so that when at data bus cycle n=1 the auxiliary device is called upon to transmit a set of signals to the destination device the auxiliary device knows to echo a high signal onto data bus conductor D<23>. Similarly, the auxiliary device should note at data bus cycle n=1 that data bus conductor D<30> is low so that when at data bus cycle n+2 the auxiliary device is called upon to transmit a set of signals to the destination device the auxiliary device knows to echo a low signal on data bus conductor D<24>.

Figure 2:
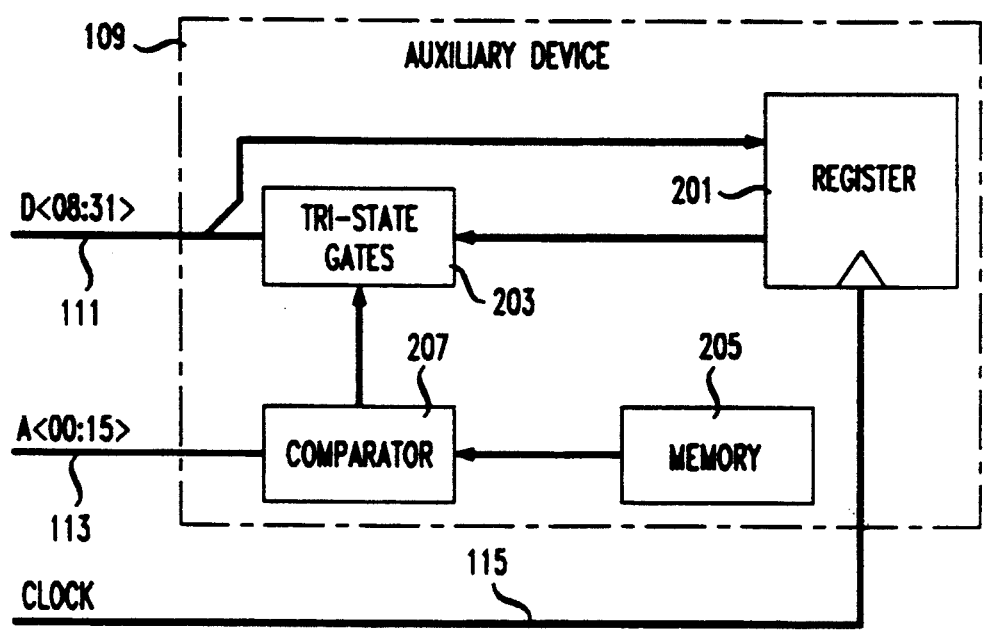
FIG. 2 is a schematic diagram of an auxiliary device which supplements the signaling of the source device in FIG. 1.

To accomplish this, as shown in FIG. 2, the auxiliary device comprises a 24-bit register 201, a set of 24 tri-state gates 203, a 1 word-deep by 16-bit memory 205 and a 16-bit comparator 207. The register receives as input the 24 signals from the data bus conductors D<08:31> and holds the signals to be echoed back onto the bus. The register is triggered by the clock 115. Because the clock defines a bus cycle, the register samples and holds the most current set of signals on the data bus. The output of the register is the data input to the tri-state gates.

The auxiliary device is advantageously programmed to recognize when the source device's signaling protocol needs to be supplemented. The memory 205 is initialized to store the source device's address and always outputs this address to the comparator 207. In addition to the source device's address, the comparator also receives as input the 16-bit address currently on the address bus. When the address on the address bus is the same as the address output by the memory (i.e., the destination device is requesting input from the source device), the comparator asserts a signal which puts the tri-state gates into a low impedance state. Each tri-state gate then outputs onto the data bus conductors D<08:31> the data from the register, thus echoing back onto the data bus those signals on D<08:31> during the last bus cycle.

When the address on the address bus does not correspond to the source device's address, the comparator retracts its output which puts the tri-state gates into the high-impedance state.

1.2. A Plurality of Source Devices—A Single Destination Device

Figure 3:
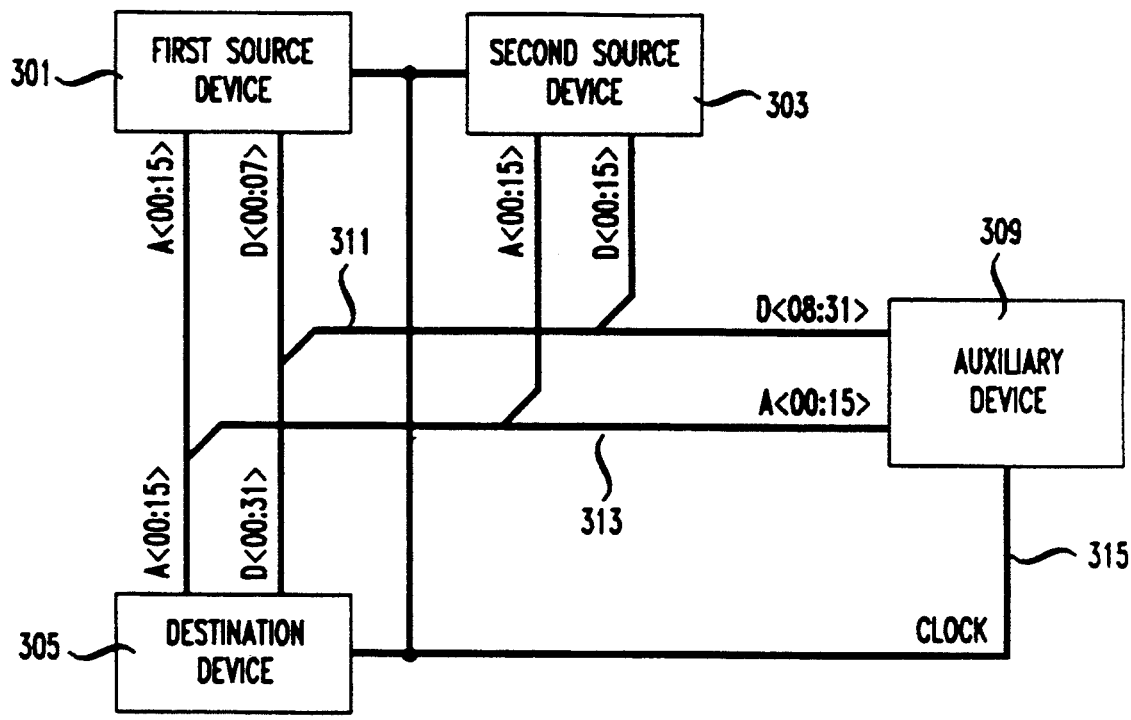
FIG. 3 is a schematic diagram of an illustrative embodiment of the invention which incorporates a plurality of source devices and a single, incompatible destination device.

FIG. 3 is a schematic diagram of an illustrative embodiment of the invention. The embodiment is a binary digital system comprising (1) a 32-bit data bus 311, (2) a 16-bit address bus 313, (3) a clock 315, (4) a first source device 301, (5) a second source device 303, (6) a destination device 305 and (7) an auxiliary device 309.

For pedagogical reasons, the illustrative embodiment has two source devices. It should be clear to those persons having ordinary skill in the art how to modify the illustrative embodiment to accommodate an arbitrary number of source devices, each connected to an arbitrary number of conductors. It should also be clear to persons having ordinary skill in the an how to modify the illustrative embodiment so that the destination device and each of the source devices may both input and output data onto the data bus.

The data bus comprises 32 conductors designated D<00:31> respectively and the address bus comprises 16 conductors designated A<00:15> respectively. The clock 115 defines a bus cycle. Each of the four devices is discussed in detail in the following subsections.

1.2.1. The First Source Device

The embodiment includes a first source device 301 (e.g., an 8-bit universal asynchronous receiver-transmitter) that, according to its signaling protocol, is capable of simultaneously outputting a set of 8 binary signals onto data bus conductors D<00:07>. The source device is not capable of interacting with data bus conductors D<08:31>.

In this embodiment the first source device receives the full 16-bit address on the address bus and also receives the clock. The first source device is memory mapped into the system's address map. The first source device is capable of recognizing when the address on the address bus corresponds to the first source device's assigned address.

When, and only when, the first source device recognizes its address on the address bus, the first source device outputs a set of signals onto the data bus for the duration of the current bus cycle. When the address on the address bus does not correspond to the first source device's address, the first source device puts its outputs onto the data bus in a high-impedance state through the use of tri-state outputs.

1.2.2. The Second Source Device

The embodiment also includes a second source device 303 (e.g., an 16-bit Ethernet controller) that, according to its signaling protocol, is capable of simultaneously outputting a set of 16 binary signals onto data bus conductors D<00:15>. The source device is not capable of interacting with data bus conductors D<16:31>.

In this embodiment the second source device receives the full 16-bit address on the address bus and also receives the clock. The second source device is memory mapped into the system's address map. The second source device is capable of recognizing when the address on the address bus corresponds to the second source device's assigned address.

When, and only when, the second source device recognizes its address on the address bus, the second source device outputs a set of signals onto the data bus for the duration of the current When the address on the address bus does not correspond to the second source device's address, the second source device puts its outputs onto the data bus in a high-impedance state through the use of tri-state outputs.

1.2.3. The Destination Device

The embodiment also includes a destination device 305 (e.g., a 32-bit microprocessor) which, according to its signaling protocol, is capable of simultaneously receiving a set of 32 binary signals from the 32 respective data bus conductors designated D<00:31>. As in the illustrative embodiment in Section 1.1., supra, each of the destination device's inputs should be conclusively driven either high or low to prevent the respective inputs from floating.

The destination device is capable of generating and outputting the clock 315. The destination device is advantageously capable of selectively generating and outputting onto the address bus the address of either of the first source device or the second source device. The destination device is advantageously capable of changing the address on the address bus synchronously with the change of the clock. When the destination device desires input from the first source device, the destination device outputs onto the address bus, for one bus cycle, the address corresponding to the first source device. When the destination device desires input from the second source device, the destination device outputs onto the address bus, for one bus cycle, the address corresponding to the second source device. For every bus cycle that the destination device outputs the source device's address, the respective source device outputs, during that same bus cycle, a set of signals onto the data bus.

1.2.4. The Auxiliary Device

To prevent any of the destination device's inputs from floating, the illustrative embodiment in FIG. 3 also includes an auxiliary device 309 which is advantageously capable of selectively generating a set of either 16 or 24 dummy signals depending on which of the first source device or the second source device is writing to the data bus.

On a symbolic level, the destination device ignores the values of the dummy signals because the destination device did not expect the supplemental input signals and because the dummy signals are not intended to convey any information. Therefore each signal in the set of dummy signals that the auxiliary device generates for transmission to the destination device may be arbitrarily either high or low. In the preferred embodiment, however, the auxiliary device "echoes" to the destination device the set of signals that were most recently transmitted, by any device, on data bus conductors D<08:31>. By echoing the most recently transmitted set of signals to the destination device, the embodiment further conserves power by reducing the occurrence of signal transitions on the data bus conductors.

Figure 4:
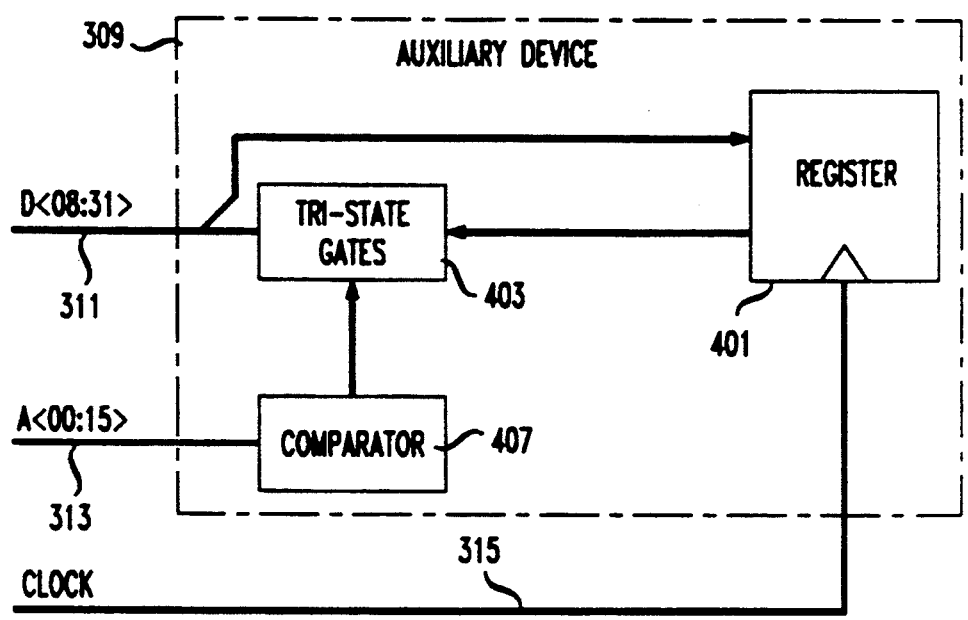
FIG. 4 is a schematic diagram of an auxiliary device which supplements the signaling of the respective source devices in FIG. 3.

To accomplish this, as shown in FIG. 4, the auxiliary device comprises (1) a 24-bit register 401, (2) a set of 24 tri-state gates 403, and (3) a 64K word by 2-bit random access memory 407. Each of these three auxiliary device components is discussed in detail in the following three subsections.

1.2.4.1. The Register

The register inputs the 24 signals from data bus conductors D<08:31>, and holds the signals for echoing back onto the bus. The register is triggered by clock 315. Because the clock defines a bus cycle, the register samples and holds the most current set of signals from the data bus. The output of the register is the data input to the tri-state gates.

1.2.4.2. The Memory

In this embodiment the memory is a random access memory, but it should be clear to persons having ordinary skill in the an how to use a content-addressable or associative memory instead, or even custom logic.

The memory is initially programmed at the memory location corresponding to the first source device's address with data which, when output and fed into the set of tri-state gates, puts the tri-state gates onto conductors D<16:31> in the low impedance state while keeping the gates onto conductors D<08:15> in the high impedance state. Analogously, the memory is also initially programmed at the memory location corresponding to the second source device's address with data which, when output and fed into the set of tri-state gates, puts all 24 tri-state gates into the low impedance state. The memory is also initially programmed at every memory location not corresponding to the address of either the first source device or the second source device with data which, when output and fed into the set of tri-state gates, puts all 24 tri-state gates into the high impedance state.

In this embodiment, the memory 407 takes as its address input the 16-bit address on the address bus 313. The output of the memory is the control input to the tri-state gates.

1.2.4.3. The Tri-State Gates

In this embodiment, the tri-state gates receive as their respective signal inputs the outputs of the register. The tri-state gates receive as their control inputs the outputs of the memory. The tri-state gates are advantageously individually controllable.

As an illustrative example of the operation of the embodiment, when the destination device desires a set of eight signals on data bus conductors D<00:07> from the first source device, the destination device outputs the first source device's address on the address bus. The first source device, upon recognizing its address on the address bus, outputs a set of eight signals onto D<00:07>. The first source device's address is also fed into the memory 407 in the auxiliary device. The output from the memory puts the 24 tri-state gates into the low impedance state such that the data in the register 401 is put onto the data bus conductors D<08:31>. In this way, all 32 data bus inputs of the destination device are driven and, advantageously, the signals on D<08:31> do not change from their values of the previous bus cycle.

1.3. One Source Device—A Plurality of Destination Devices

Figure 5:
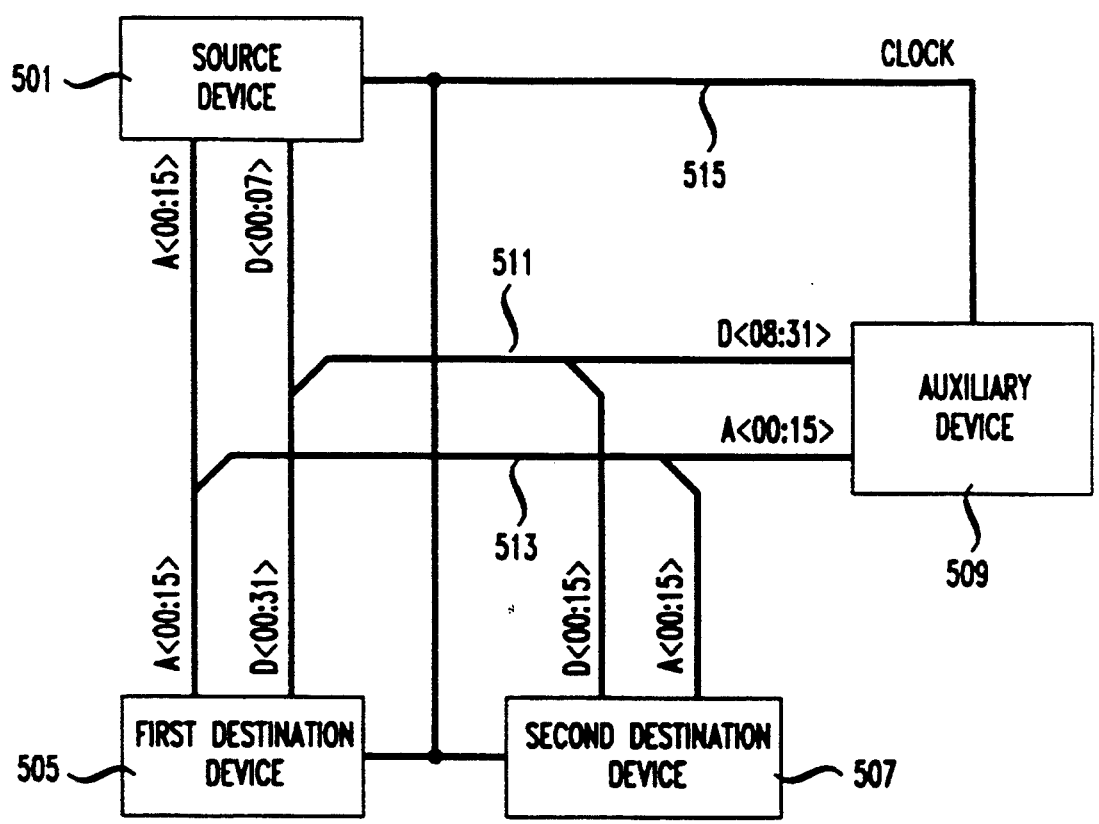
FIG. 5 is a schematic diagram of an illustrative embodiment of the invention which incorporates a single source device and a plurality of incompatible destination devices.

FIG. 5 is a schematic diagram of an illustrative embodiment of the invention. The embodiment is a binary digital system comprising (1) a 32-bit data bus 511, (2) a 16-bit address bus 513, (3) a clock 515, (4) a source device 501, (5) a first destination device 505, (6) a second destination device 507 and (7) an auxiliary device 509.

For pedagogical reasons, the illustrative embodiment has two destination devices. It should be clear to those persons having ordinary skill in the art how to modify the illustrative embodiment to accommodate an arbitrary number of destination devices, each connected to an arbitrary number of conductors. It should also be clear to persons having ordinary skill in the art how to modify the illustrative embodiment so that each of the source devices and the destination devices may both input and output data onto the data bus.

The data bus comprises 32 conductors designated D<00:31> respectively and the address bus comprises 16 conductors designated A<00:15> respectively. The clock 515 defines a bus cycle. Each of the four devices is discussed in detail in the following subsections.

1.3.1. The Source Device

The embodiment includes a source device 501 (e.g., an 8-bit universal asynchronous receiver-transmitter) that, according to its signaling protocol, is capable of simultaneously outputting a set of 8 binary signals onto data bus conductors D<00:07>. The source device is not capable of interacting with data bus conductors D<08:31>.

In this embodiment the source device receives the full 16-bit address on the address bus and also receives the clock. The source device is memory mapped into the system's address map. The source device is capable of recognizing when the address on the address bus corresponds to the source device's assigned address.

When, and only when, the source device recognizes its address on the address bus, the source device outputs a set of signals onto the data bus for the duration of the current bus cycle. When the address on the address bus does not correspond to the source device's address, the source device puts its outputs onto the data bus in a high-impedance state through the use of tri-state outputs.

1.3.2. The First Destination Device

The embodiment also includes a first destination device 505 (e.g., a 32-bit microprocessor) which, according to its signaling protocol, is capable of simultaneously receiving a set of 32 binary signals from the 32 respective data bus conductors designated D<00:31>.

The first destination device is capable of generating and outputting the clock 515. The first destination device is also capable of generating and outputting a sixteen bit address on the address bus 513. The first destination device is advantageously capable of changing the address on the address bus synchronously with the change of the clock. When the first destination device desires to receive input from the source device, the first destination device outputs onto the address bus the source device's address. For every bus cycle that the first destination device outputs the source device's address, the source device outputs, during that same bus cycle, a set of signals onto the data bus.

In this embodiment, the source device is connected only to data bus connectors D<00:07> and, therefore, the source device can only drive the inputs of the destination device that are connected to D<00:07>. Potentially then, the destination device will have 24 inputs (those connected to D<08:31>) dissipating an excessive amount of power.

1.3.3. The Second Destination Device

The embodiment also includes a second destination device 507 (e.g., a 16-bit Ethernet controller) which, according to its signaling protocol, is capable of simultaneously receiving a set of 16 binary signals from the 16 respective data bus conductors designated D<00:15>.

The second destination device is capable of receiving the full 16-bit address on the address bus and also receiving the clock. In this embodiment, the source device is connected only to data bus connectors D<00:07> and, therefore, the source device can only drive the inputs of the second destination device that are connected to D<00:07>. Potentially then, the second destination device will have 8 inputs (those connected to D<08:15>) dissipating an excessive amount of power.

1.3.4. The Auxiliary Device

To prevent this unwanted power dissipation, the illustrative embodiment in FIG. 5 also includes an auxiliary device 509 which is capable of generating a set of 24 supplementary or "dummy" signals. In accordance with this illustrative embodiment, the 24 dummy signals are transmitted by the auxiliary device, over D<08:31>, to both destination devices contemporaneously with the transmission of the set of signals, over D<00:07>, by the source device. Because the auxiliary device conclusively drives each of the first destination device's inputs and the second destination device's inputs not driven by the source device, none of the respective destination device's inputs float. NOTE: When the source device outputs a set of supplementary signals to the data bus the auxiliary device always transmits 24 dummy signals, regardless of the destination of the set of signals sent by the source device. This is because whether the first destination device or the second destination device inputs the signals from the source device, the first destination device's inputs connected to D<08:31> must be driven by the auxiliary device. Note too, therefore the design of the auxiliary device is advantageously simplified such that it is identical to the auxiliary device in Section 1.1.3., supra.

On a symbolic level, both destination devices ignore the values of the dummy signals because they do not expect input signals on the leads D<08:31> and the dummy signals are not intended to convey information. Therefore each signal in the set of dummy signals that the auxiliary device generates for transmission to both destination devices may be arbitrarily either high or low. In the preferred embodiment, however, the auxiliary device "echoes" to both destination devices the set of signals that were most recently transmitted, by any device, on data bus conductors D<08:31>. By echoing the most recently transmitted set of signals to both destination devices, the embodiment further conserves power by reducing the occurrence of signal transitions on the data bus conductors.

Figure 6:
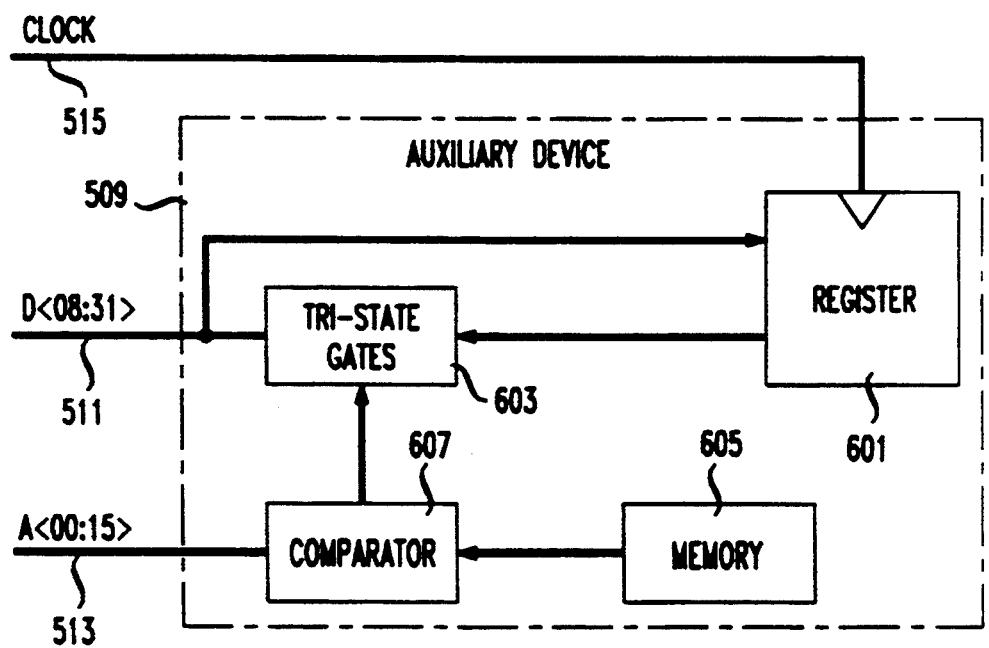
FIG. 6 is a schematic diagram of an auxiliary device which supplements the signaling of the source device in FIG. 5.

To accomplish this, as shown in FIG. 6, the auxiliary device comprises a 24-bit register 601, a set of 24 tri-state gates 603, a 16-bit by one-word-deep memory 605 and a 16-bit comparator 607. The register receives as input the 24 signals from the data bus conductors D<08:31> and holds the signals to be echoed back onto the bus. The register is triggered by the clock 515. Because the clock defines a bus cycle, the register samples and holds the most current set of signals on the data bus. The output of the register is the data input to the tri-state gates.

The auxiliary device is advantageously programmed to recognize when the source device's signaling protocol needs to be supplemented. The memory 605 is initialized to store the source device's address and always outputs this address to the comparator 607. In addition to the source device's address, the comparator also receives as input the 16-bit address currently on the address bus. When the address on the address bus is the same as the address output by the memory (i.e., the destination device is requesting input from the source device), the comparator asserts a signal which puts the tri-state gates in one of the low impedance states. Each tri-state gate then outputs onto the data bus conductors D<08:31> the data from the register, thus echoing onto the data bus those signals most recently present on the data bus.

1.4. A Plurality of Source Devices—A Plurality of Destination Devices

In light of the illustrative embodiments, supra, it should be clear to persons having ordinary skill in the art how to modify the illustrative embodiments to accommodate an arbitrary number of source devices and destination devices. It should be also clear how to modify the illustrative embodiments to accommodate an arbitrary number of devices, each of which is connected to an arbitrary number of conductors and each of which are capable of both inputting and outputting data.

2. An Illustrative Embodiment for Providing Information

Figure 7:
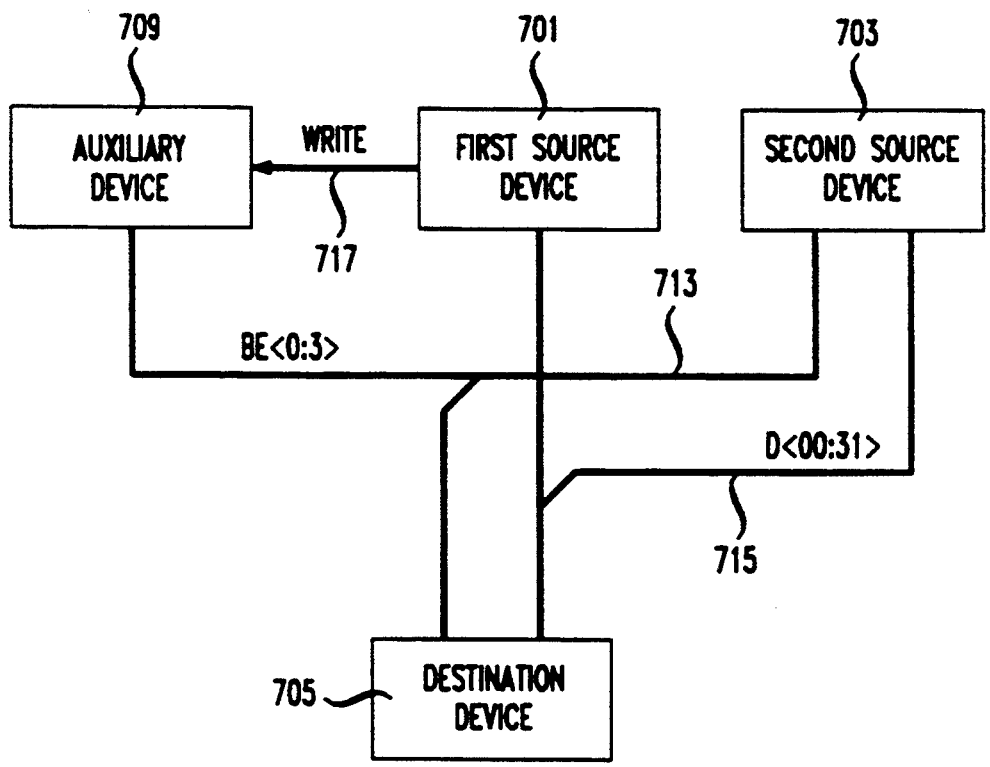
FIG. 7 is a schematic diagram of an illustrative embodiment of the invention which incorporates a single source device, a single, incompatible destination device and an auxiliary device. In this embodiment, the auxiliary device provides information to the destination device which is unavailable from the source device.

FIG. 7 is a schematic diagram of an illustrative embodiment of the invention. The embodiment is a binary digital system comprising (1) a 32-bit data bus 715, (2) a 4-bit byte enable bus 713, (3) a first source device 701, (4) a second source device 703, (5) a destination device 705, (6) an auxiliary device 709 and (7) a write signal 717.

The data bus comprises 32 conductors designated D<00:31>, respectively, that are grouped by eights into four "byte lanes." The byte enable bus comprises 4 conductors designated BE<0:3>, respectively. The byte enable bus carries a set of four signals called the "byte marks". The "byte marks" indicate which of the four byte lanes is currently carrying valid signals. Each of the four devices is discussed in detail in the following subsections.

2.1. The First Source Device

The embodiment includes a first source device 701 (e.g., a 32-bit Ethernet controller) that, according to its signaling protocol, is capable of simultaneously outputting a set of 32 binary signals onto D<00:31>. When, and only when, the first source device outputs data onto the data bus, the first source device asserts the write signal. The first source device is not capable of generating any byte marks.

When the address on the address bus does not correspond to the first source device's address, the first source device puts its outputs onto the data bus in a high-impedance state.

2.2. The Second Source Device

The embodiment also includes a second source device 703 (e.g., a 32-bit microprocessor) that, according to its signaling protocol, is capable of simultaneously outputting any combination of 8, 16, 24 or 32 binary signals onto any combination of the first, second, third and/or fourth byte lanes. The second source device is additionally capable of generating and outputting the appropriate byte marks onto BE<0:3>.

The second source device has tri-state outputs such that when the second source device is not writing to the data bus, the second source device puts its outputs onto both the data bus and the byte enable bus into the high impedance state. The first source device and the second source device never simultaneously write to the data bus.

2.3. The Destination Device

The embodiment also includes a destination device 705 (e.g., a 32-bit byte-addressable memory) that has a signaling protocol that conforms to the signaling protocol of the second source device 703 and that is capable of simultaneously receiving a set of 8, 16, 24 or 32 binary signals from the data bus conductors designated D<00:31>. Because the destination device can accept either 8, 16, 24 or 32 binary signals, the destination device must be informed by the respective source device exactly how many signals are being transmitted and on which byte lanes. The destination device learns how many signals are being sent and on which byte lanes by reading the byte marks on BE<0:3>.

In this embodiment, however, the first source device is incapable of generating the byte marks needed by the destination device. This presents two problems. First, when the first source device is writing to the data bus, the destination device inputs associated with BE<0:3> will potentially float and second, the destination device is kept from knowing which byte lanes on the data bus contain valid data.

2.4. The Auxiliary Device

Figure 8:
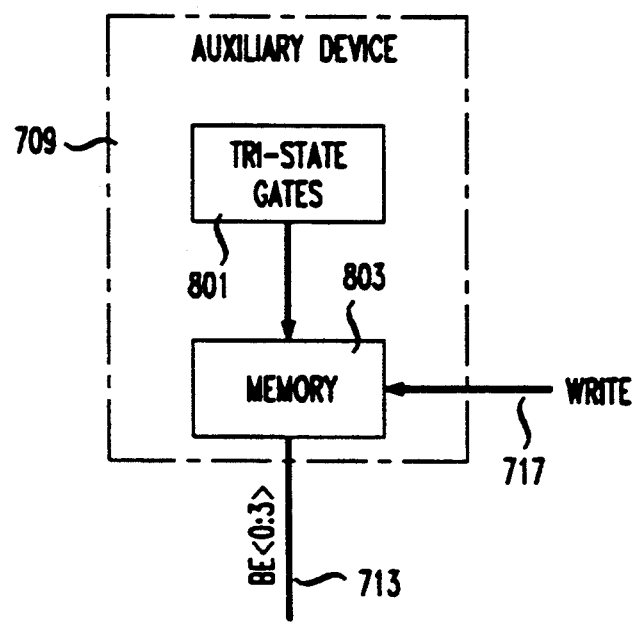
FIG. 8 is a schematic diagram of the auxiliary device in FIG. 7.

To preclude this situation, the illustrative embodiment of the invention also includes an auxiliary device 709 that, according to its particular signaling protocol, is capable of generating and outputting a set of byte marks onto BE<0:3>. As shown in FIG. 8, the auxiliary device comprises a memory 801 and a set of tri-state gates 803.

The memory is 1 word by 4 bits and is initially programmed with the set of byte marks that corresponds to the set of signals that the first source device outputs onto the data bus. The four bits of output from the memory are the data input to the set of four tri-state gates, respectively. The write signal from the first source device is the control input to the tri-state gates.

When the write signal is asserted by the first source device, the tri-state gates output onto the byte enable bus the byte marks stored in memory. When the write signal is retracted by the first source device, the tri-state gates are put into the high impedance state.

It should be obvious to persons having ordinary skill in the art how to modify the illustrative embodiment, supra, to accommodate an arbitrary number of devices, each of which are capable of both inputting and outputting data.

What is claimed is:

1. An apparatus comprising:
   a source device (101) capable of sending a first set of signals, via a first set of conductors, in conformity with a source signaling protocol;
   a destination device (105), connected to said source device by said first set of conductors, which demands a set of signals in conformity with a destination signaling protocol and which destination device is capable of receiving said first set of signals; and
   an auxiliary device (109), connected to said destination device via a second set of conductors, said auxiliary device including,
      means for knowing when said source device is sending said first set of signals to said destination device;
      means for generating a supplemental set of signals that complements said first set of signals such that said first set of signals and said supplemental set of signals together conform to said destination signaling protocol; and
      means for sending said supplemental set of signals to said destination device via said second set of conductors.

2. The apparatus of claim 1 wherein said auxiliary device is capable of receiving an original set of signals from said second set of conductors.

3. The apparatus of claim 2 wherein said auxiliary device further comprises means for storing said original set of signals.

4. The apparatus of claim 3 wherein said supplemental set of signals is said original set of signals.

5. An apparatus comprising:
   a first source device (301) capable of sending a first set of signals, via a first set of conductors, according to a first source signaling protocol;
   a second source device (303) capable of sending a second set of signals, via said first set of conductors and a second set of conductors, according to a second source signaling protocol;
   a destination device (303), connected to said first source device by said first set of conductors and said second source device by said first set of conductors and by said second set of conductors, which destination device demands a set of signals in conformity with a destination signaling protocol and which destination device is capable of receiving said first set of signals and said second set of signals; and
   an auxiliary device (309), connected to said destination device via said second set of conductors and a third set of conductors, said auxiliary device including,
      means for knowing when said first source device is sending said first set of signals to said destination device;
      means for generating a supplemental set of signals that complements said first set of signals such that said first set of signals and said supplemental set of signals together conform to said destination signaling protocol; and
      means for sending said supplemental set of signals to said destination device via said second set of conductors and said third set of conductors.

6. The apparatus of claim 5 wherein said auxiliary device is capable of receiving an original set of signals from said second set of conductors and said third set of conductors.

7. The apparatus of claim 6 wherein said auxiliary device further comprises means for storing said original set of signals.

8. The apparatus of claim 7 wherein said supplemental set of signals is said original set of signals.

9. An apparatus comprising:
   a source device (501) capable of sending a first set of signals, via a first set of conductors, according to a source signaling protocol;
   a first destination device (505), connected to said source device, by said first set of conductors, which first destination device demands a second set of signals in conformity with a first destination signaling protocol and which first destination device is capable of receiving said first set of signals;
   a second destination device (507), connected to said source device, said first set of conductors, which second destination device demands a third set of signals in conformity with a second destination signaling protocol and which second destination device is capable of receiving said first set of signals; and
   an auxiliary device (509), connected to said first destination device by a second set of conductors, and a third set of conductors and connected to said second destination device by said second set of conductors, said auxiliary device including,
      means for knowing when said source device is sending said first set of signals to said first destination device;
      means for generating a supplemental set of signals that complements said first set of signals such that said first set of signals and said supplemental set of signals together conform to both said first destination signaling protocol; and means for sending said supplemental set of signals to both said first destination device and said second destination device via said second set of conductors.

10. The apparatus of claim 9 wherein said auxiliary device is capable of receiving an original set of signals from said second set of conductors.

11. The apparatus of claim 10 wherein said auxiliary device further comprises means for storing said original set of signals.

12. The apparatus of claim 11 wherein said supplemental set of signals is said original set of signals.

* * * * *